US010694388B2

(12) United States Patent
Liang et al.

(10) Patent No.: US 10,694,388 B2
(45) Date of Patent: Jun. 23, 2020

(54) TORUS-QUORUM BASED CHANNEL RENDEZVOUS METHOD FOR DIRECTIONAL ANTENNAS

(71) Applicant: SHENYANG INSTITUTE OF AUTOMATION, CHINESE ACADEMY OF SCIENCES, Liaoning (CN)

(72) Inventors: Wei Liang, Liaoning (CN); Haibin Yu, Liaoning (CN); Bo Yang, Liaoning (CN); Meng Zheng, Liaoning (CN); Shiwei Peng, Liaoning (CN); Shiming Li, Liaoning (CN)

(73) Assignee: Shenyang Institute of Automation, Chinese Academy of Sciences, Liaoning (CN)

( * ) Notice: Subject to any disclaimer, the term of this patent is extended or adjusted under 35 U.S.C. 154(b) by 15 days.

(21) Appl. No.: 16/073,023

(22) PCT Filed: May 18, 2017

(86) PCT No.: PCT/CN2017/084790
§ 371 (c)(1),
(2) Date: Jul. 26, 2018

(87) PCT Pub. No.: WO2018/098999
PCT Pub. Date: Jun. 7, 2018

(65) Prior Publication Data
US 2019/0069183 A1 Feb. 28, 2019

(30) Foreign Application Priority Data
Nov. 30, 2016 (CN) .......................... 2016 1 1079631

(51) Int. Cl.
*H04W 16/10* (2009.01)
*H04B 1/713* (2011.01)
(Continued)

(52) U.S. Cl.
CPC ............ *H04W 16/10* (2013.01); *H04B 1/713* (2013.01); *H04B 1/7156* (2013.01); *H04W 16/14* (2013.01)

(58) Field of Classification Search
None
See application file for complete search history.

(56) References Cited

U.S. PATENT DOCUMENTS

| 2010/0290378 A1* | 11/2010 | Wu | H04W 52/0216 370/311 |
| 2011/0142025 A1* | 6/2011 | Agee | H04B 7/0413 370/342 |
| 2017/0302331 A1* | 10/2017 | Tan | H04W 72/0446 |

FOREIGN PATENT DOCUMENTS

| CN | 103581920 A | 2/2014 |
| CN | 105744640 A | 7/2016 |

OTHER PUBLICATIONS

International Search Report for PCT/CN2017/084790, dated Aug. 16, 2017 in English and Chinese Language (4 pgs.).

(Continued)

*Primary Examiner* — Saumit Shah
(74) *Attorney, Agent, or Firm* — Smith, Gambrell & Russell, LLP

(57) ABSTRACT

The present invention relates to a Torus-Quorum based channel rendezvous method for directional antennas. A pair of directional antennas facing any side initially points to the other party mutually in one Torus-Quorum system cycle through a rotation closure attribute of a Torus-Quorum system; and a receiver and a sender switch to a same available channel according to frequency hopping sequences to realize channel rendezvous. In the Torus-Quorum based channel rendezvous method for directional antennas proposed in the present invention, the directional antennas are rotated based on the Torus-Quorum, and elements are (Continued)

ensured to coincide with each other within limited time through the rotation closure attribute of the Torus-Quorum system, i.e., directions are opposite, thereby effectively shortening channel rendezvous time of the directional antennas.

9 Claims, 2 Drawing Sheets

(51) Int. Cl.
    *H04W 16/14* (2009.01)
    *H04B 1/7156* (2011.01)

(56) References Cited

OTHER PUBLICATIONS

Khatibi, S., et al. Quorum-Based Pure Directional Neighbor Discovery in Self-Organized Ad Hoc Networks. 5th International Symposium on Telecommunications, 2010. pp. 476-481.

Romaszko, S., et al. Torus Quorum System and Difference Set-based Rendezvous in Cognitive Radio Ad Hoc Networks. 7th International ICST Conference on Cognitive Radio Oriented Wireless Networks and Communications, 2012. pp. 202-207.

\* cited by examiner

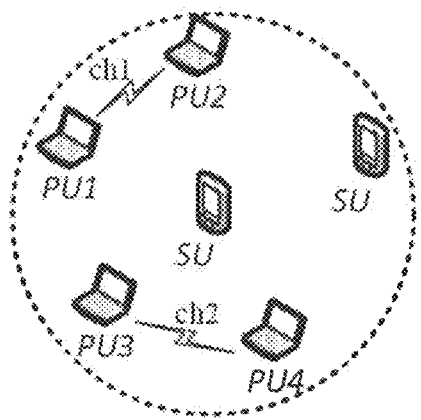
FIG. 1a
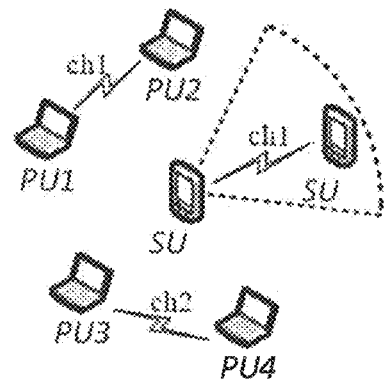
FIG. 1b
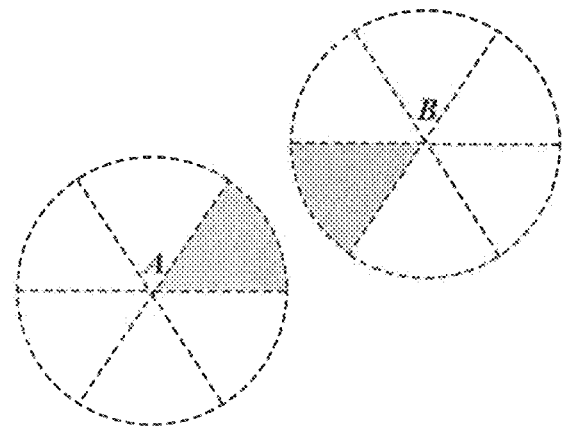
FIG. 2
FIG. 3
FIG. 4

TORUS-QUORUM BASED CHANNEL RENDEZVOUS METHOD FOR DIRECTIONAL ANTENNAS

TECHNICAL FIELD

The present invention relates to cognitive radio network technologies and in particular to a Torus-Quorum based channel rendezvous method for directional antennas.

BACKGROUND

Cognitive radio technologies are key technologies for currently solving a contradiction between supply and demand of a wireless spectrum and increasing a spectrum utilization rate. A dynamic spectrum access mode allows a secondary user to access an idle authorized spectrum opportunistically, thereby alleviating the shortage problem of spectrum resources. In a cognitive radio network, a primary user shall use an authorized spectrum with a priority higher than that of the secondary user. To avoid affecting normal communication of the primary user, the secondary user needs to perceive spectrum availability before accessing channels, and then adopts an underlay or overlay spectrum sharing mechanism for coexistence with the primary user.

A primary link of realizing network construction and communication by the cognitive radio network is that neighborhood secondary users can find the other party mutually, and access a common available channel to conduct data transmission. This process is channel rendezvous, and is a precondition for realizing steps of communication handshake, message exchange, topology control, routing maintenance and the like by the neighborhood users.

According to a need for maintaining a dedicated common control channel in the network, a channel rendezvous strategy is classified into two categories currently: a channel rendezvous strategy with auxiliary common control channel and a blind channel rendezvous strategy without auxiliary common control channel. Although the channel rendezvous method with auxiliary common control channel can simplify the process for realizing channel rendezvous between the secondary users, the common control channel is easy to be occupied by the primary user in the cognitive radio network so that availability of the common control channel cannot be ensured at any time, thereby blocking rendezvous between the secondary users. In addition, the common control channel may bring the problem of single-point failure due to easy interference by malicious users. The blind channel rendezvous strategy does not need to maintain the common control channel, is a channel rendezvous strategy based on frequency hopping sequences of channels, makes full use of excellent channel switching performance of a cognitive radio device and can increase diversity of rendezvous channels, thereby avoiding defects of the common control channel. The blind channel rendezvous strategy is a channel rendezvous technology in general use. The channel rendezvous strategy technology based on frequency hopping sequences of channels is performed on a time division multiple access (TDMA) system. Each secondary user generates own frequency hopping sequences of channels according to a predefined sequence construction method. The sequence determines the channel access sequence of the secondary user. Once a pair of neighborhood users switches to the same available channel in the same time slot through channel frequency hopping within a communication range, rendezvous is successfully achieved. The frequency hopping sequences of the channels comprise a clock synchronization-constrained synchronous sequence and a clock synchronization-unconstrained asynchronous sequence. Apparently, the latter has wider applicability. To this end, designed frequency hopping sequences of channels shall ensure rendezvous under the condition that a clock offset of a frequency hopping node is arbitrary. In addition, to prevent rendezvous channels from generating problems of saturation and congestion, the feature of diversity of the channels in the cognitive radio network shall be fully used, so that rendezvous opportunities are uniformly distributed on all channels in the network, thereby ensuring accessed fairness of the channels. However, the secondary users using the frequency hopping method need to frequently switch the channels in order to achieve balanced channel load, causing large time consumption. Thus, the designed frequency hopping sequences shall achieve deterministic rendezvous in the shortest possible time.

At present, most of studies on channel rendezvous consider to configure omnidirectional antennas for the secondary users, i.e., signals are transmitted in all directions within an antenna communication range. In this way, primary users within the entire antenna signal coverage range may be disturbed, as shown in FIG. 1a. To reduce disturbance, directional antennas are configured, i.e., the signals are only transmitted in a certain specific direction. This is a promising communication technology, as shown in FIG. 1b. However, for a rendezvous problem under a directional antenna scenario, the difficulty is that antenna directions of a pair of neighborhood users must be opposite and the same channel is accessed to realize possible rendezvous; otherwise, rendezvous cannot be achieved even within a range of mutual communication. Thus, the present invention will be achieved in two steps: in the first step, directional antennas facing any direction initially are rotated to positions to face the other party mutually as soon as possible; and in the second step, the receiver and the sender switch the channels in accordance with predefined deterministic frequency hopping sequences to access the common available channel as soon as possible.

SUMMARY

With respect to a problem of large interference generated by a currently adopted channel rendezvous method for omnidirectional antennas to primary users within a transmission range, the present invention proposes a method for alleviating the interference to the primary users by configuring directional antennas, i.e., a signal is transmitted only to a certain specific direction in each time slot. In the method, the frequency hopping sequence of each communication node is generated independently according to Torus-Quorum elements. Rendezvous can be successfully achieved as long as the directional antennas of the receiver and the sender are rotated to relatively facing positions within the same time slot and access the same channel.

A technical solution adopted in the present invention to solve the technical problem is as follows: A Torus-Quorum based channel rendezvous method for directional antennas comprises the following steps:

a pair of directional antennas facing any side initially points to the other party mutually in one Torus-Quorum system cycle through a rotation closure attribute of a Torus-Quorum system;

a receiver and a sender switch to a same available channel according to frequency hopping sequences to realize channel rendezvous.

The step that a pair of directional antennas facing any side initially points to the other party mutually in one Torus-Quorum system cycle through a rotation closure attribute of a Torus-Quorum system comprises the following steps:

a cycle of directional antenna scanning sequences is abstracted as a number of Torus-Quorum universal set elements, i.e., each element in a universal set corresponds to one time slot; antenna directions are rotated according to a selection rule of the Torus-Quorum system, i.e., directional antennas are rotated in each time slot by an angle of $\Phi=2\pi/N$, wherein N is a number of all channels in a network;

the rotation closure attribute of Torus-Quorum guides two directional antennas to point to the other party mutually in one cycle length.

The step that the rotation closure attribute of Torus-Quorum guides two directional antennas to point to the other party mutually in one cycle length comprises the following steps:

1) the directional antenna scanning sequences are successively arranged into a matrix of h×w row by row; n=h×w acts as a sequence cycle length of nodes; h is a number of rows; and w is a number of columns;

2) all elements of one column c are selected randomly; an element in a rth row is selected as a starting point from the selected column randomly; $\lfloor w/2 \rfloor$ elements after the element are continuously selected as one Torus-Quorum, wherein 1≤c≤w and 1≤r≤h; meanwhile, the selected $\lfloor w/2 \rfloor$ elements are repeatedly arranged according to a circle of the matrix: when the column of the selected element exceeds a rightmost column, return to a leftmost column of the matrix cyclically and then the elements are successively selected backwards;

3) elements respectively selected by the two directional antennas coincide in the matrix in a certain position, achieving that the two directional antennas point to the other party mutually in respective scanning sequences.

The step that a receiver and a sender switch to a same available channel according to frequency hopping sequences comprises the following steps:

the receiver and the sender respectively select least primes not less than local available channel numbers $|C_A|$ and $|C_B|$ as frequency hopping cycles $P_A$ and $P_B$;

if $P_A > |C_A|$ or/and $P_B > |C_A|$, the receiver or/and the sender traverse all local channels in each cycle and then randomly supplement $P_A - |C_A|$ and $P_B - |C_B|$ channels respectively, wherein $C_A$ is an available channel set of the receiver and $C_B$ is an available channel set of the sender.

The sequence of a next cycle of the sender is obtained successively by that the sequence of a previous cycle forward rotates by one place cyclically.

Cycle lengths of the frequency hopping sequences of the receiver and the sender are coprime.

The Torus-Quorum based channel rendezvous method for directional antennas proposed in the present invention is proposed on the premise of adequately considering directional rotation of cognitive radio network antennas and multi-channel switching feature. A pair of directional antennas can be quickly guided to point to the other party mutually in one Torus-Quorum system cycle (i.e., the number of elements of the universal set) through the rotation closure attribute of the Torus-Quorum system. Specifically:

1. In the Torus-Quorum based channel rendezvous method for directional antennas proposed in the present invention, the directional antennas are rotated based on the Torus-Quorum, and elements (i.e., time slots) are ensured to coincide with each other within limited time through the rotation closure attribute of the Torus-Quorum system, i.e., directions are opposite, thereby effectively shortening channel rendezvous time of the directional antennas.

2. The method in the present invention makes full use of the feature that the receiver and the sender respectively traverse local available channels according to fixed and circle rotation rules to further ensure quick access of a common channel on the basis of opposite antenna directions and realize quick rendezvous of the directional antennas; and the method is suitable for use in large-scale wireless networks.

3. The channel rendezvous method proposed in the method of the present invention has generality, is suitable for scenarios of clock asynchronization and channel isomerization, and is an effective method capable of ensuring rendezvous of the directional antennas.

DESCRIPTION OF DRAWINGS

FIG. 1a is a comparison diagram 1 of omnidirectional antennas and directional antennas;

FIG. 1b is a comparison diagram 2 of omnidirectional antennas and directional antennas;

FIG. 2 is a schematic diagram of a main transmitting angle of a directional antenna;

FIG. 3 is a schematic diagram of a Torus-Quorum matrix;

FIG. 4 is a schematic diagram of expanding a Torus-Quorum matrix into a directional antenna scanning sequence.

DETAILED DESCRIPTION

Figure 5:
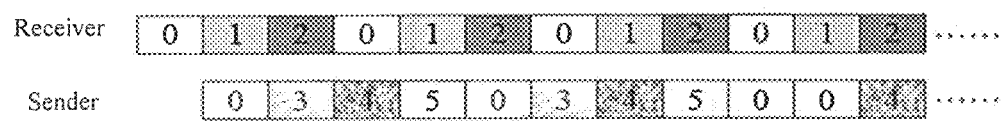
FIG. 5 is a schematic diagram of frequency hopping sequences of a receiver and a sender after antenna directions of neighborhood users are opposite.

The present invention will be further described in details below in combination with embodiments.

The present invention relates to cognitive radio network technologies and in particular to a method for enabling secondary users with directional antennas to realize channel rendezvous under conditions of clock asynchronization and channel isomerization. When the method is used to design directional antenna scanning sequences, by adequately considering the rotation characteristic of the directional antennas, channel diversity, the rotation closure attribute of the Torus-Quorum and other characteristics, the directional antenna scanning sequences formed by expanding by lines and connecting a Torus-Quorum matrix are used for determining the positions of neighborhood secondary users. On this basis, a common access channel is negotiated by cyclic frequency hopping sequences generated by that the receiver and the sender respectively traverse the local available channels according to fixed and cyclic rotation modes, so as to ensure that opposite directions of the directional antennas are realized within limited time as soon as possible and the same channel is accessed. A method proposed by the present invention is a channel rendezvous method for directional antennas, which can be widely applied.

A Torus-Quorum based channel rendezvous method for directional antennas comprises the following steps:

the method is a blind channel rendezvous method suitable for configuring directional antenna nodes;

a node (i.e., a secondary user) that configures the directional antennas acquires a precise direction of a neighborhood node antenna by using the coincident closure of the elements generated by Torus-Quorum within a limited cycle, so as to find a neighbor within the limited time;

after the precise direction of the neighborhood node directional antenna is acquired, the pair of nodes adjusts the antennas to opposite directions and switch the channels in accordance with predefined frequency hopping sequences until the channels are converged on the common available channel;

the cyclic frequency hopping sequences of the receiver and the sender are generated according to predefined rules; the receiver traverses local available channels in each cycle according to a fixed sequence, while the sender is based on traversing the local available channels, and the frequency hopping sequence of a previous cycle in each cycle successively forward moves by one place cyclically so as to accelerate to search an operation channel of the receiver.

A cognitive user configures the directional antennas, and transmits the signal only to a specific orientation at some time. Compared with the omnidirectional antennas, the interference to the primary user within a transmission range can be obviously reduced. In the method, rendezvous can be successfully achieved as long as the directional antennas of the receiver and the sender mutually face the other party and access the same channel.

The method makes full use of the rotation closure attribute of Torus-Quorum; coincident elements can occur within the limited cycle regardless of an initial position to start to rotate the antennas, i.e., different cognitive users rotate the antennas through respective antenna scanning sequences, so as to ensure that the antennas mutually point to the other party within the limited time.

A cognitive radio network environment considered in the present invention comprises M (M≥2) users. It is assumed that the network has different time slots and all the time slots have the same length. A licensed spectrum band in the cognitive radio network is divided into N (N≥1) orthogonal channel, i.e., $C=\{ch_0, ch_1, \ldots ch_{N-1}\}$. Before the frequency hopping sequences are constructed, the secondary user detects idle available channels which can be observed by the secondary user through a currently mature spectrum perception technology. Each user configures a two-dimensional plane fan-shaped directional antenna. The antenna has a main transmitting angle. The amplitude of the main transmitting angle is $\Phi=2\pi/N$, i.e., the signal is only transmitted within the range of the main transmitting angle, as shown in FIG. 2. Without loss of generality, the present invention considers a paired rendezvous problem between a pair of users A and B. To ensure that rendezvous is achieved, under the condition that each user has arbitrary available channels, at least one common available channel is shared to expect rendezvous. If the available channel set of the user A and the user B are respectively $C_A$ and $C_B$, then $C_A \cap C_B \neq \emptyset$ is satisfied. In view of difficult realization of clock synchronization in a distributed cognitive radio network, the present invention considers the rendezvous method simultaneously suitable for clock synchronization and clock asynchronization.

The present invention uses the nature of Torus-Quorum when designing the frequency hopping sequences of the directional antennas.

Definition 1 (Quorum system): system Q is a set of non-empty subsets under a universal set U. If any two subsets taken from Q satisfy the following intersection attributes: $\forall G, H \in Q$ and $G \cap H \neq \emptyset$, then system Q is a Quorum system. Each subset in system Q is a Quorum. For example, $Q=\{\{0,1\},\{0,2\},\{1,2\}\}$ is a Quorum system under the universal set $U=\{0,1,2\}$. G and H represent subsets of Q.

Definition 2 (rotation of Quorum system): a nonnegative integer i is given. The system Q is the Quorum system under the universal set U. The nonempty set G is a subset in Q. i rotation of G is defined as rotate(G,i)=$\{(x+i)$ mod $n|x \in G\}$. If $G=\{0,1,2\}$, then rotate(G,1)=$\{1,2,0\}$.

Definition 3 (rotation closure attribute): for the Quorum system Q under the universal set $U=\{0, \ldots, n-1\}$, if the following conditions are satisfied: $\forall G, H \in Q, i \in (0, \ldots, n-1)$, $G \cap $rotate$(H,i) \neq \emptyset$, then the Quorum system Q satisfies the rotation closure attribute. For example, a Quorum system $Q=\{\{0,1\},\{0,2\},\{1,2\}\}$ of the universal set $U=\{0,1,2\}$ satisfies the rotation closure attribute. n represents the number of elements in the universal set U.

Definition 4 (Torus-Quorum system): cycles of the nodes are arranged into a matrix of h×w in a matrix manner, and n=h×w acts as a sequence cycle length of the nodes. All elements of one column c (1≤c≤w) are selected randomly through the Torus-Quorum rendezvous method; an element in a rth row (1≤r≤h) is selected as a starting point from the selected column randomly; $\lfloor w/2 \rfloor$ elements after the element are continuously selected as one Quorum; meanwhile, the selected $\lfloor w/2 \rfloor$ elements are repeatedly arranged according to a circle of the matrix, i.e., when the column of the selected element exceeds a rightmost column, return to a leftmost column of the same row cyclically and then the elements are successively selected backwards. At the universal set $U=\{0, 1, \ldots, 17\}$(i.e., h=3, w=6), FIG. 3 gives two Torus-Quorum examples.

Nature 1 (Torus-Quorum system satisfies the rotation closure attribute): the matrix is n=h×w; the universal set $N=\{0, 1, \ldots, n-1\}$; Q is a Torus-Quorum system under the universal set N; H (Q is a Torus-Quorum; and H includes cth column of elements and continuous $\lfloor w/2 \rfloor$ elements after the element at the rth row and the cth column in the h×w array. A set rotate(H,i) obtained after H performs i rotation remains a Torus-Quorum structure. Apparently, because each Torus-Quorum selects continuous $\lfloor w/2 \rfloor+1$ elements on the rth row, any two Torus-Quorums certainly have at least one common element in the universal set N, i.e., $\forall G, H \in Q, G \cap $rotate$(H,i) \neq \emptyset$. Therefore, the Torus-Quorum system satisfies the rotation closure attribute. N represents the length of an antenna scanning sequence cycle, and i represents a clock offset between two users.

In the present invention, a cycle of directional antenna scanning sequences is abstracted as a number of Torus-Quorum universal set elements, i.e., each element in a universal set corresponds to one time slot; and antenna directions are rotated according to a selection rule of the Torus-Quorum system, i.e., directional antennas are rotated in each time slot by an angle of $\Phi=2\pi/N$. The rotation closure attribute of Torus-Quorum guides two directional antennas to point to the other party mutually in one cycle length.

In the rendezvous problem of the directional antennas, opposite directions of two directional antennas are the premise of rendezvous. However, even if the directions are opposite, two antennas may not access the same channel. After the directions are determined, two nodes still need to adopt the frequency hopping sequences that sequentially access all local available channels to switch the channels until the conditions that the directions of two node antennas are opposite and the antennas access the same channel are satisfied. A specific frequency hopping rule is as follows: the frequency hopping sequence of each cycle of the receiver traverses all local available channels according to a fixed increasing sequence, while the frequency hopping sequence of each cycle of the sender not only needs to traverse all local available channels, but also needs to actively detect the receiver in a change sequence (definition 2) that a previous cycle sequence is successively forward rotated by one place cyclically in accordance with a next cycle sequence so as to achieve rendezvous as soon as possible. In addition, to enable two nodes to traverse combination modes of all common available channels, cycle lengths of the frequency hopping sequences of the receiver and the sender shall be coprime. Thus, the receiver and the sender shall respectively select least primes (recorded as $P_A$ and $P_B$) not less than local available channel numbers ($|C_A|$ and $|C_B|$) as frequency hopping cycles. If $P_A > |C_A|$ or/and $P_B > |C_B|$, the receiver or/and the sender need to traverse all local channels in each cycle and then randomly supplement $P_A - |C_A|$ or/and $P_B - |C_B|$ channels.

The Torus-Quorum based channel rendezvous method for directional antennas proposed in the present invention has a main concept that: in a first step, a pair of directional antennas facing any side initially points to the other party mutually in one Torus-Quorum system cycle through a rotation closure attribute of a Torus-Quorum system; this is a premise of directional rendezvous; in a second step, on a basis of opposite directions, the receiver and the sender are further switched to a same available channel as soon as possible according to predefined frequency hopping sequences to realize channel rendezvous.

The achieving method of the first step is described below by taking FIG. 3 as an example. In FIG. 3, the number of the elements in the universal set of the Torus-Quorum system is n=3×6. According to a generating rule (definition 4) of the Torus-Quorum system, the user A (represented with light grey in FIG. 3) randomly selects the entire sixth column of elements and subsequent any row of three elements in $\lfloor 6/2 \rfloor = 3$ columns (if a borderline is exceeded, cycle forward); and the user B (represented with dark grey in FIG. 3) randomly selects the entire second column of elements and subsequent any row of three elements in $\lfloor 6/2 \rfloor = 3$ columns. It can be known from the rotation closure attribute (nature 1) of the Torus-Quorum system that certain elements selected by the user A and the user B inevitably coincide, such as element 1 in FIG. 3.

The Torus-Quorum system in FIG. 3 is represented in a matrix manner, while the scanning sequences of the directional antennas are formed by expanding by rows and connecting the matrix, as shown in FIG. 4. It can also be seen from FIG. 4 that two scanning sequences achieve coincidence at a time slot 1.

In a clock asynchronous network, initial directions of the directional antennas of two users may be arbitrary. After a neighborhood node is scanned, each node rotates the antenna by an angle $\Phi = 2\pi/N$ in each time slot according to the same direction (e.g., clockwise direction). Because scanning cycles of the directional antennas of two nodes are identical (i.e., the number of universal sets of the Torus-Quorum system), the rotation closure attribute of the Torus-Quorum system enables the two directional antennas to point to the other party mutually in a certain time slot under a clock asynchronous scenario.

The Torus-Quorum system stated above can enable the directional antennas facing any direction initially to point to the other party mutually in limited time. But even so, if channels accessed by two antennas are different, successful rendezvous still cannot be realized. To this end, based on the first step, the pair of neighborhood users fixedly rotates the antennas by an angle, and continue to switch the channels through the predefined frequency hopping sequences, so as to ensure that two nodes access the same available channel as soon as possible.

The achieving method of the second step will be described below in combination with FIG. 5.

The frequency hopping sequences of the receiver and the sender are generated only based on the local available channels. To enable two nodes to traverse combination modes of all common available channels, the receiver and the sender can acquire least primes (represented with $P_A$ and $P_B$ respectively) not less than the number of local available channels before the frequency hopping sequences are generated in accordance with a coprime principle of the cycle lengths.

The receiver does not need to know the sender, and only needs to passively receive data. Therefore, the frequency hopping sequence of each cycle of the receiver only needs to traverse the local available channels according to a fixed sequence. The cycle of the frequency hopping sequences of the receiver is $P_A$, and the frequency hopping sequences successively access all the local available channels according to an increasing sequence in previous $|C_A|$ time slots. If $P_A > |C_A|$, then ($P_A - |C_A|$) channels need to be randomly supplemented at subsequent ($P_A - |C_A|$) time slots. FIG. 5 gives the frequency hopping sequence of the receiver when $C_A = \{0,1,2\}$ and $P_A = |C_A| = 3$.

The sender needs to actively detect the receiver and transmits data. Thus, the frequency hopping sequence of each cycle of the sender needs to traverse the local available channels according to different change sequences. Similar to the receiver, the cycle of the frequency hopping sequences of the sender is $P_B$, and the frequency hopping sequences successively access all the local available channels according to an increasing sequence in previous $|C_B|$ time slots of the first cycle. If $P_B > |C_B|$, then ($P_B - |C_B|$) channels need to be randomly supplemented at subsequent ($P_B - |C_B|$) time slots. The difference from the receiver is that, the channel access sequence of each cycle of the sender may be changed, and a change rule is that: the sequence of a next cycle is obtained successively by that the sequence of a previous cycle forward rotates by one place cyclically. FIG. 5 shows the frequency hopping sequence of the sender when $C_B = \{0, 3,4,5\}$, $|C_A| = 4$ and $P_B = 5$. The sequence of the first cycle needs to supplement one channel, i.e., $\{0,3,4,5,\underline{0}\}$, while the second cycle is obtained by forward moving the previous period cyclically by one place, i.e., $\{3,4,5,\underline{0},0\}$.

The frequency hopping sequences generated based on the above rule by the receiver and the sender can ensure rendezvous. The reason is that the frequency hopping sequences of the receiver and the sender have coprime cycle lengths $P_A$ and $P_B$, and can traverse, within $P_A P_B$ time slots, the combination modes of all the local channels which certainly at least comprise one common available channel of the users A and B.

We claim:

1. A Torus-Quorum based rendezvous method for directional antennas, comprising the following steps:
   a) pointing a pair of directional antennas, comprising a sender antenna and a receiver antenna, to face one another through a rotation closure attribute in a Torus-Quorum system; and
   b) accessing a common channel with the sender and receiver antennas based on frequency hopping sequences,
   wherein step (a) comprises;
     a1) arranging a cycle of directional antenna scanning sequences as a number of Torus-Quorum universal set elements, with each element in the universal set made to correspond to one time slot;

a2) rotating antenna directions according to a selection rule of the Torus-Quorum system, with each rotation in a time slot being at an angle Φ=2π/N, wherein N is a number of all channels in a network of the directional antennas; and a3) pointing the pair of directional antennas to face one another in one cycle length.

2. The method according to claim 1, wherein step (a3) comprises:

a31) arranging the directional antenna scanning sequences into a matrix of h×w, where n=h×w is a sequence cycle length of nodes; h is a number of rows; and w is a number of columns;

a32) selecting from the matrix, separately for the sender and receiver antennas, all elements of one column c and one element in any $r^{th}$ row in subsequent columns continuously following the column c as one Torus-Quorum, wherein 1≤c≤w and 1≤r≤h; wherein, when selection of an element in a subsequent column requires selection of an element in a column c>w, that element is instead selected from the column c=1, and any remaining elements are successively selected in subsequent columns continuously;

a33) pointing the pair of directional antennas to face one another when, in respective scanning sequences of the two antennas, elements selected in the matrix for the respective two antennas coincide in a certain position.

3. A Torus-Quorum based rendezvous method for directional antennas, comprising the following steps:

a) pointing a pair of directional antennas, comprising a sender antenna and a receiver antenna, to face one another through a rotation closure attribute in a Torus-Quorum system; and b) accessing a common channel with the sender and receiver antennas based on frequency hopping sequences, wherein step (b) comprises:

b1) selecting, for the receiver antenna, a least prime that is not less than the number $|C_A|$ of channels in an available local channel set $C_A$ of the receiver antenna as a number $|P_A|$ of time slots in a frequency hopping cycle $P_A$ of the receiver antenna; and selecting, for the sender antenna, a least prime that is not less than the number $|C_B|$ of channels in an available local channel set $C_B$ of the sender antenna as a number $|P_B|$ of time slots in a frequency hopping cycle $P_B$ of the sender antenna; and b2) traversing the channels in the respective local channel sets $C_A$ and $C_B$ in each cycle of the respective frequency hopping cycles $P_A$ and $P_B$, wherein, if $|P_A|>|C_A|$, then supplement time slots ($|P_A|-|C_A|$) in $P_A$ with channels from the local channel set $C_A$; and, if $|P_B|>|C_B|$, then supplement time slots ($|P_B|-|C_B|$) in $P_B$ with channels from the local channel set $C_B$.

4. The method according to claim 3, wherein a starting position in a sequence of traversing channels in the frequency hopping cycle $P_B$ of the sender antenna is shifted by one place in successive cycles.

5. The method according to claim 3, wherein cycle lengths of the frequency hopping sequences of the receiver and the sender antennas are coprime.

6. A Torus-Quorum based rendezvous method for directional antennas, comprising the following steps:

a) pointing a pair of directional antennas, comprising a sender antenna and a receiver antenna, to face one another through a rotation closure attribute in a Torus-Quorum system; and b) accessing a common channel with the sender and receiver antennas based on frequency hopping sequences, wherein step (a) comprises:

a1) arranging a cycle of directional antenna scanning sequences as a number of Torus-Quorum universal set elements, with each element in the universal set made to correspond to one time slot;

a2) rotating antenna directions according to a selection rule of the Torus-Quorum system, with each rotation in a time slot being at an angle of Φ=2π/N, wherein N is a number of all channels in a network of the directional antennas; and a3) pointing the pair of directional antennas to face one another in one cycle length, wherein step (b) comprises:

b1) selecting, for the receiver antenna, a least prime that is not less than the number $|C_A|$ of channels in an available local channel set $C_A$ of the receiver antenna as a number $|P_A|$ of time slots in a frequency hopping cycle $P_A$ of the receiver antenna; and selecting, for the sender antenna, a least prime that is not less than the number $|C_B|$ of channels in an available local channel set $C_B$ of the sender antenna as a number $|P_B|$ of time slots in a frequency hopping cycle $P_B$ of the sender antenna; and b2) traversing the channels in the respective local channel sets $C_A$ and $C_B$ in each cycle of the respective frequency hopping cycles $P_A$ and $P_B$, wherein, if $|P_A|>|C_A|$, then supplement time slots ($|P_A|-|C_A|$) in $P_A$ with channels from the local channel set $C_A$; and, if $|P_B|>|C_B|$, then supplement time slots ($|P_B|-|C_B|$) in $P_B$ with channels from the local channel set $C_B$.

7. The method according to claim 6, wherein step (a3) comprises:

a31) arranging directional antenna scanning sequences into a matrix of h×w, where n=h×w is a sequence cycle length of nodes; h is a number of rows; and w is a number of columns;

a32) selecting from the matrix, separately for the sender and receiver antennas, all elements of one column c and one element in any $r^{th}$ row in ⌊w/2⌋ subsequent columns continuously following the column c as one Torus-Quorum, wherein 1≤c≤w and 1≤r≤h; wherein, when selection of an element in a subsequent column requires selection of an element in a column c>w, that element is instead selected from the column c=1, and any remaining elements are successively selected in subsequent columns continuously;

a33) pointing the pair of directional antennas to face one another when, in respective scanning sequences of the two antennas, elements selected in the matrix for the respective two antennas coincide in a certain position.

8. The method according to claim 6, wherein a starting position in a sequence of traversing channels in the frequency hopping cycle $P_B$ of the sender antenna is shifted by one place in successive cycles.

9. The method according to claim 6, wherein cycle lengths of the frequency hopping sequences of the receiver and the sender antennas are coprime.

* * * * *